Patented Feb. 10, 1925.

1,525,770

UNITED STATES PATENT OFFICE.

OTTO ERNST AND OTTO NICODEMUS, OF HOCHST-ON-THE-MAIN, GERMANY, ASSIGNORS TO FARBWERKE VORM. MEISTER LUCIUS & BRÜNING, OF HOCHST-ON-THE-MAIN, GERMANY, A CORPORATION OF GERMANY.

PROCESS OF PREPARING HIGHLY-ACTIVE CHARCOAL.

No Drawing. Application filed July 9, 1923. Serial No. 650,542.

*To all whom it may concern:*

Be it known that we, OTTO ERNST and OTTO NICODEMUS, citizens of Germany, residing at Hochst-on-the-Main, Germany, have invented certain new and useful Improvements in Processes of Preparing Highly-Active Charcoal, of which the following is a specification.

It is known that wood and similar materials can be converted by suitable treatment either with or without the use of chemical agents into highly active charcoal. If, however, instead of wood, fossil carbon formed after the cretaceous period, by which expression we mean to designate peat and raw lignite, is treated in the same way the resulting charcoal is, as compared with that prepared from wood, inferior in that it is too voluminous and not sufficiently hard for many practical purposes.

We have now found that the inexpensive materials, peat and lignite, may be utilized in the preparation of active charcoal which with respect to absorption capacity is superior to and with respect to hardness is not inferior to and with respect to volume weight, i. e. the weight of a unit measure for instance 100 ccm. of the subdivided material, is not substantially distinguished from active charcoal prepared from wood by carbonizing in a suitable apparatus suitable forms, or subdivisions thereof produced by cutting or the like, made by pressing a mixture moistened or impregnated if necessary with chemicals such as alkalies, zinc chloride or phosphoric acid of the peat or lignite and finely divided wood such as sawdust.

The following example illustrates our new process: 100 parts of peat are ground and mixed with 50 parts of sawdust, then soaked with a solution of phosphoric acid and after being completely and intimately mixed, pressed in to forms, which, if required, may be subdivided in any suitable manner. The carbonization is carried out in any manner, for instance in a revolving furnace.

Having now described our invention, what we claim is:

1. Process of preparing highly active charcoal which comprises carbonizing compressed bodies of a mixture of a fossil carbon formed after the cretaceous period with finely divided wood.

2. As a new product, highly active charcoal consisting essentially of a carbonized compressed mixture of fossil carbon formed after the cretaceous period and finely divided wood.

In testimony whereof, we affix our signatures.

DR. OTTO ERNST. [L. S.]
DR. OTTO NICODEMUS. [L. S.]

Witnesses:
PAUL A. WILLIAMS,
C. C. L. B. WYLES.